United States Patent  (10) Patent No.: US 8,482,937 B2
Lin et al.  (45) Date of Patent: Jul. 9, 2013

(54) SWITCHING CONTROL CIRCUITS WITH VALLEY LOCK FOR POWER CONVERTERS

(75) Inventors: Chao-Chih Lin, Guanyin Township, Taoyuan County (TW); Ying-Chieh Su, Sijhih (TW); Jhih-Da Hsu, Sindian (TW); Chia-Yo Yeh, Changhua (TW); Wei-Ting Wang, Qiaotou Township, Kaohsiung County (TW)

(73) Assignee: System General Corporation, Sindian, Taipei County (TW)

( * ) Notice: Subject to any disclaimer, the term of this patent is extended or adjusted under 35 U.S.C. 154(b) by 433 days.

(21) Appl. No.: 12/962,948

(22) Filed: Dec. 8, 2010

(65) Prior Publication Data

US 2011/0305053 A1 Dec. 15, 2011

Related U.S. Application Data

(60) Provisional application No. 61/353,792, filed on Jun. 11, 2010.

(51) Int. Cl.
*H02M 3/335* (2006.01)

(52) U.S. Cl.
USPC .................. 363/21.01; 363/21.05; 363/21.08; 363/21.1; 363/21.13; 363/21.16; 363/21.18; 363/97

(58) Field of Classification Search
USPC ........... 363/21.01, 21.04, 21.05, 21.08, 21.1, 363/21.12, 21.13, 21.16, 21.18, 97, 131
See application file for complete search history.

(56) References Cited

U.S. PATENT DOCUMENTS

| | | | |
|---|---|---|---|
| 7,248,487 B1* | 7/2007 | Indika de Silva et al. | 363/21.18 |
| 2008/0278225 A1* | 11/2008 | Hu et al. | 327/543 |
| 2009/0257251 A1* | 10/2009 | Su et al. | 363/21.15 |
| 2010/0097104 A1* | 4/2010 | Yang et al. | 327/103 |
| 2010/0296318 A1* | 11/2010 | Teo | 363/21.03 |
| 2010/0302812 A1* | 12/2010 | Moon et al. | 363/21.01 |
| 2011/0305053 A1* | 12/2011 | Lin et al. | 363/95 |
| 2012/0170330 A1* | 7/2012 | Yang et al. | 363/21.13 |
| 2012/0230064 A1* | 9/2012 | Yang et al. | 363/21.15 |
| 2013/0027988 A1* | 1/2013 | Yang et al. | 363/21.15 |

* cited by examiner

*Primary Examiner* — Jeffrey Sterrett

(74) *Attorney, Agent, or Firm* — McClure, Qualey & Rodack, LLP

(57) ABSTRACT

A switching control circuit for a switching power converter is provided. The switching control circuit is coupled to a switching device and an auxiliary winding of a transformer. The switching control circuit includes a valley detecting circuit, a valley lock circuit, and a PWM circuit. The valley detecting circuit is coupled to receive a reflected voltage signal from the auxiliary winding of the transformer for outputting a control signal in response to the reflected voltage signal. The valley lock circuit is coupled to receive the control signal for outputting a judging signal in response to the control signal during a first period and a second period following the first period. The PWM circuit outputs a switching signal in response to the judging signal.

12 Claims, 10 Drawing Sheets

SWITCHING CONTROL CIRCUITS WITH VALLEY LOCK FOR POWER CONVERTERS

CROSS REFERENCE TO RELATED APPLICATIONS

This application claims the benefit of U.S. Provisional Application No. 61/353,792, filed on Jun. 11, 2010, the contents of which are incorporated herein by reference.

BACKGROUND OF THE INVENTION

1. Field of the Invention

The present invention relates to a switching control circuit, and more specifically to a switching control circuit applied for a switching power converter.

2. Description of the Related Art

A power converter is used to convert an unregulated power source to a regulated voltage or current source. The power converter normally includes a transformer or a magnetic device having a primary winding and a secondary winding to provide isolation. A switching device connected in the primary winding to control energy transfer from the primary winding to the secondary winding. The power converter operates at a high frequency for allowing size and weight reduction.

However, the switching operation of the switching device will generate switching losses and electric-magnetic-interference (EMI). FIG. 1 shows a fly-back power converter, and waveforms of the related signals are shown in FIG. 2. The switching device $Q_1$ is applied to switch a transformer $T_1$ and control the power delivered from a primary winding $N_P$ to a secondary winding $N_S$ of the transformer $T_1$. A switching signal $V_G$ is generated to drive the switching device $Q_1$. Energy is stored in the transformer $T_1$ when the switching device $Q_1$ is turned on by the switching signal $V_G$ during a turned-on period $T_{ON}$. As the switching device $Q_1$ is switched off, the energy of the transformer $T_1$ is discharged to the output of the fly-back power converter through a rectifier $D_S$. In the meantime, a reflected voltage signal $V_R$ (not shown) is generated in the primary winding $N_P$ of the transformer $T_1$ in accordance with an output voltage $V_O$ across an output capacitor $C_O$ and the turn-ratio of the transformer $T_1$. Therefore, a voltage $V_D$ across the switching device $Q_1$ is equal to an input voltage $V_{IN}$ plus the reflected voltage signal $V_R$ once the switching device Q1 is turned off. The energy from the voltage $V_D$ is stored in an imaginary parasitic capacitor $C_Q$, corresponding to the parasitic capacitance of the switching device $Q_1$. After a discharge period $T_{DS}$, the energy of the transformer $T_1$ is fully discharged, the energy stored in the parasitic capacitor $C_Q$ flows back to the input voltage $V_{IN}$ through the primary winding $N_P$ of the transformer $T_1$. The parasitic capacitor $C_Q$ and the primary winding inductor (not shown) of the transformer $T_1$ develop a resonant tank, wherein its resonant frequency $f_R$ can be shown as equation (1):

$$f_R = \frac{1}{2\pi\sqrt{L_p \times C_j}} \tag{1}$$

Wherein, $C_j$ is the capacitance of the parasitic capacitor $C_Q$; $L_P$ is the inductance of the primary winding inductor of the transformer $T_1$.

During the resonant period, the energy of the parasitic capacitor $C_Q$ is delivered to the primary inductor of the transformer $T_1$ back and forth. There is a delay time $T_q$ corresponding to the time the parasitic capacitor $C_Q$ takes to discharge until the voltage $V_D$ reaches a minimum value. The delay time $T_q$ is the period of the quasi-resonance, and it can be expressed as equation (2):

$$T_q = \frac{1}{4 \times f_R} \tag{2}$$

Sum up, if the switching device $Q_1$ is turned on during the valley voltage across the switching device $Q_1$, the soft switching can be achieved, so as to minimize the switching loss and EMI of the power converter.

BRIEF SUMMARY OF THE INVENTION

An exemplary embodiment of a switching control circuit for a switching power converter is provided. The switching control circuit is coupled to a switching device and an auxiliary winding of a transformer. The switching control circuit comprises a valley detecting circuit, a valley lock circuit, and a pulse width modulation (PWM) circuit. The valley detecting circuit is coupled to receive a reflected voltage signal from the auxiliary winding of the transformer for outputting a control signal in response to the reflected voltage signal. The valley lock circuit is coupled to receive the control signal for outputting a judging signal in response to the control signal during a first period and a second period following the first period. The PWM circuit outputs a switching signal in response to the judging signal.

An exemplary embodiment of a switching power converter is provided. The switching power converter comprises a switching device, a transformer, and a switching control circuit. The switching device is controlled by a switching signal. The transformer has a primary winding and an auxiliary winding. The switching control circuit is coupled to the switching device and the auxiliary winding of the transformer. The switching control circuit comprises a valley detecting circuit, a valley lock circuit, and a PWM circuit. The valley detecting circuit is coupled to receive a reflected voltage signal from the auxiliary winding of the transformer for outputting a control signal in response to the reflected voltage signal, wherein the reflected voltage signal is generated from a resistor coupled to the auxiliary winding of the transformer while the switching device is turned off. The valley lock circuit is coupled to receive the control signal for outputting a judging signal in response to the control signal during a first period and a second period following the first period. The PWM circuit is coupled to the valley lock circuit for receiving the judging signal and outputting the switching signal to turn on the switching device in response to the judging signal.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
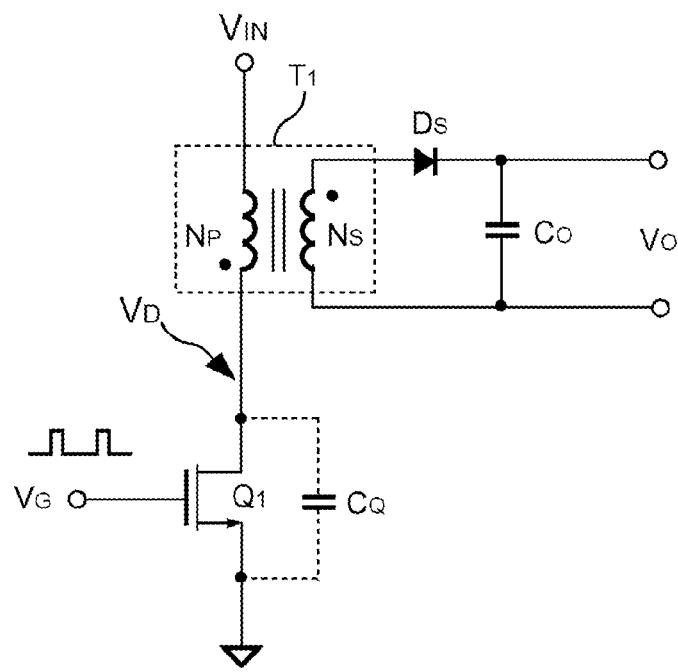
FIG. 1 shows a fly-back power converter.
Figure 2:
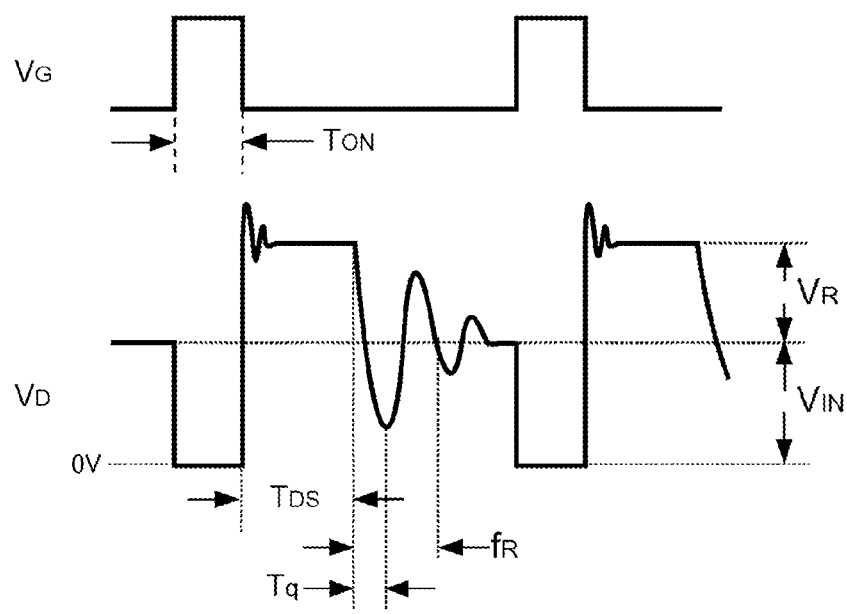
FIG. 2 shows waveforms of signals of the fly-back power converter in FIG. 1.
Figure 3:
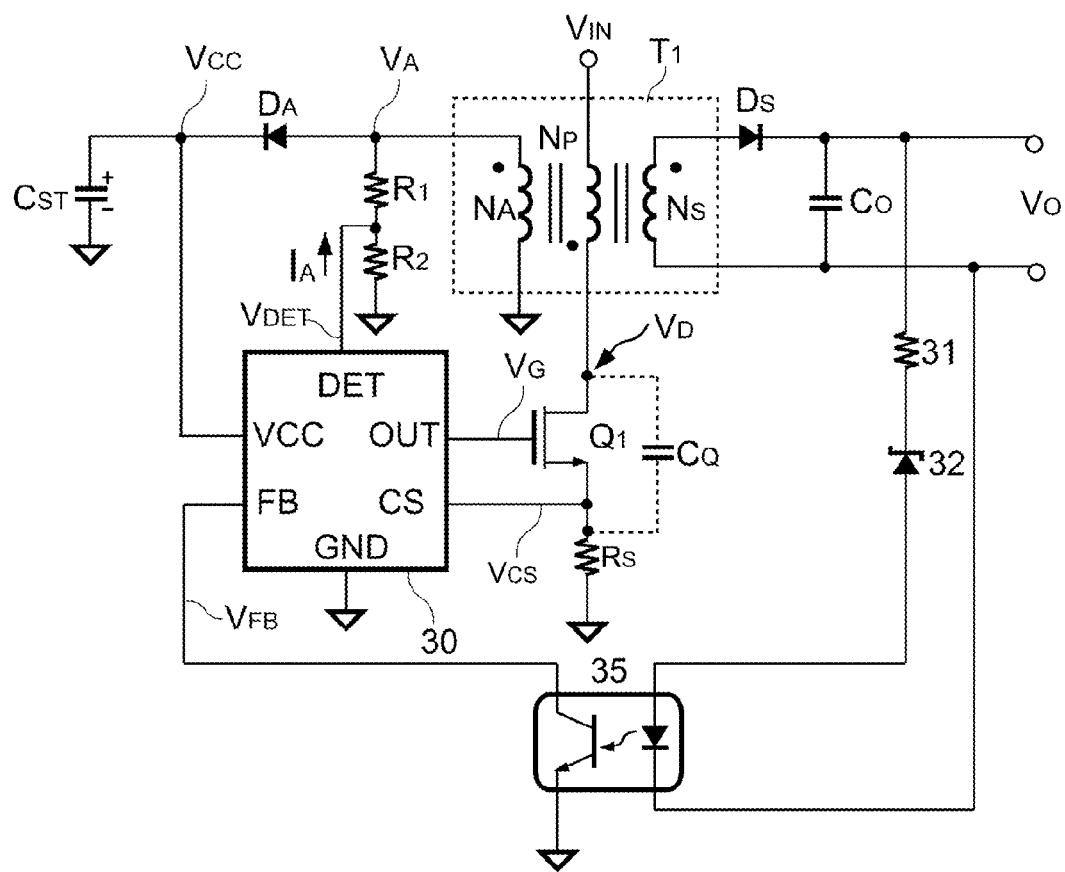
FIG. 3 shows an exemplary embodiment of a switching power converter.

FIG. 3 shows an exemplary embodiment of a switching power converter, in which a switching control circuit 30 includes a feedback terminal FB, a current sense terminal CS, a voltage detecting terminal DET, an output terminal OUT, a power terminal VCC, and a reference terminal GND. A transformer $T_1$ includes a primary winding $N_P$, a secondary winding $N_S$, and an auxiliary winding $N_A$. The primary winding $N_P$ is coupled to a switching device $Q_1$, the secondary winding $N_S$ is coupled to an output terminal of the switching power converter through a first rectifier $D_S$ and an output capacitor $C_O$, and the auxiliary winding $N_A$ is coupled to the power terminal VCC of the switching control circuit 30 through a second rectifier $D_A$ and a capacitor $C_{ST}$ for supplying power $V_{CC}$ to the switching control circuit 30.

Reference is again made to FIG. 3, the voltage detecting terminal DET of the switching control circuit 30 is coupled to the auxiliary winding $N_A$ through resistors $R_1$ and $R_2$, wherein the switching control circuit 30 receives a reflected voltage signal $V_A$ from the resistor $R_2$ while the switching device $Q_1$ is turned off. The output terminal OUT of the switching control circuit 30 generates a switching signal $V_G$ to drive the switching device $Q_1$. A current sensing resistor $R_S$ is coupled to the switching device $Q_1$ for generating a switching current signal $V_{CS}$ while the switching device $Q_1$ is turned on. Moreover, the current sensing terminal CS of the switching control circuit 30 is coupled to the current sensing resistor $R_S$ for receiving the switching current signal $V_{CS}$. Furthermore, the feedback terminal FB of the switching control circuit 30 is coupled to an optical coupler 35 for receiving a feedback signal $V_{FB}$. The optical coupler 35 is coupled to the output terminal of the switching power converter through a resistor 31 and a voltage stabilizer 32 for receiving an output voltage $V_O$ across the output capacitor $C_O$ and transforming the output voltage $V_O$ into the feedback signal $V_{FB}$.

Reference is again made to FIG. 3. The switching control circuit 30 receives the reflected voltage signal $V_A$ from the auxiliary winding $N_A$ of the transformer $T_1$ through the resistors $R_1$ and $R_2$, while the switching device $Q_1$ is turned off. Then, the switching control circuit 30 detects whether the voltage across the switching device $Q_1$ is close to a valley voltage of the reflected voltage signal $V_A$ during one resonant period and whether a same or larger valley number is detected compared to the previous resonant period. The switching control circuit 30 turns on the switching device $Q_1$ when a same or larger valley number is detected, which enhances the efficiency of the switching power converter and avoid noise.

Figure 4:
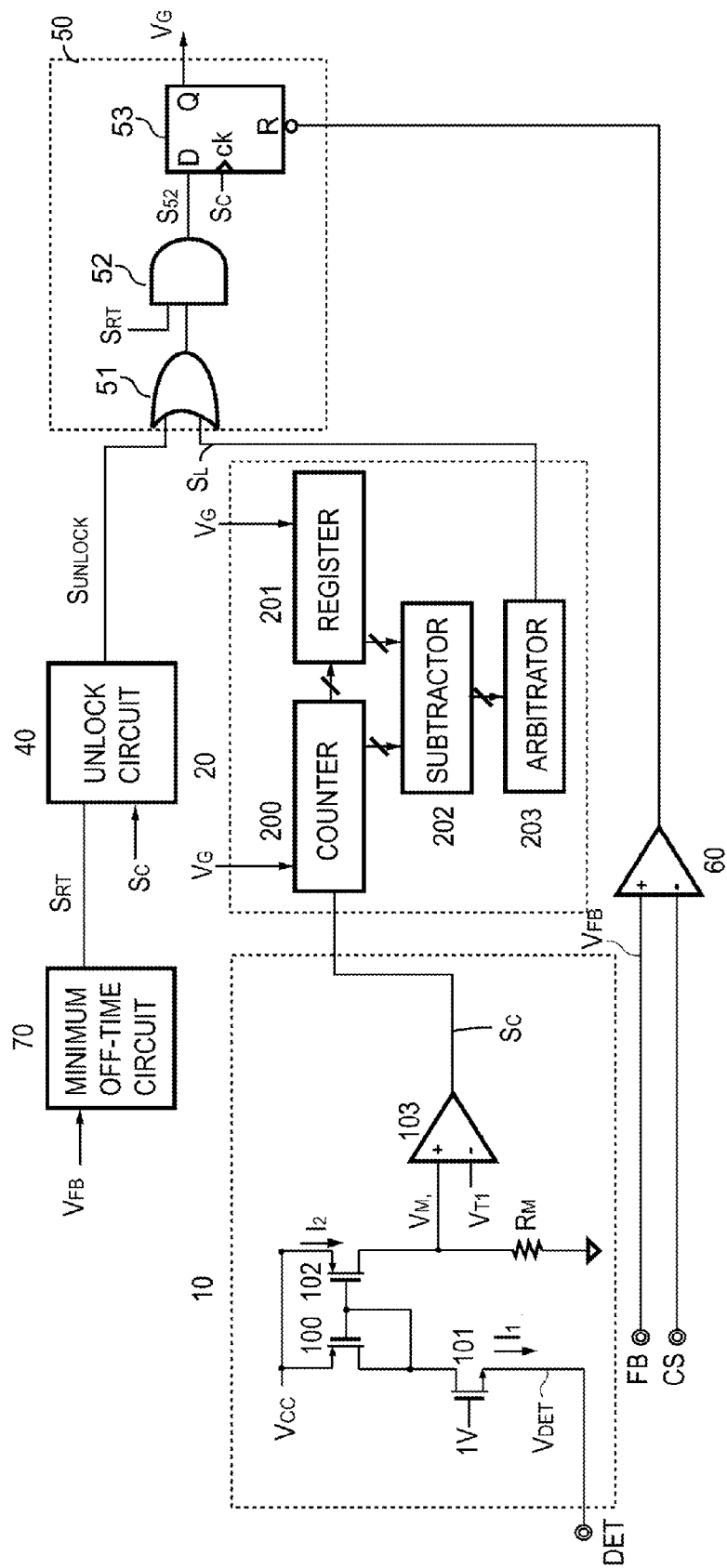
FIG. 4 shows an exemplary embodiment of a switch control circuit of the switching power converter in FIG. 3.

FIG. 4 shows an exemplary embodiment of the switch control circuit 30. The switching control circuit 30 comprises a valley detecting circuit 10, a valley lock circuit 20, a minimum off-time circuit 70, a unlock circuit 40, and a pulse width modulation (PWM) circuit 50.

The valley detecting circuit 10 includes a switch 101, a first current mirror which is composed of transistors 100 and 102, a sampling resistor $R_M$, and a comparator 103. The first current mirror is coupled to the auxiliary winding $N_A$ of the transformer $T_1$ through the switch 101 and the resistors $R_1$ and $R_2$ (shown in FIG. 3). The switch 101 receives the reflected voltage signal $V_A$ which is in proportional to the voltage $V_D$ across the switching device $Q_1$ from the resistor $R_2$ while the switching device $Q_1$ is turned off. The reflected voltage signal $V_A$ has alternate positive voltage and negative voltage during the resonant period.

When the reflected voltage signal $V_A$ is in the negative voltage, the switch 101 is turned on, and a first current $I_1$ flows through the switch 101. At this time, the first current mirror mirrors the first current $I_1$ into a second current $I_2$. Then, the sampling resistor $R_M$ coupled to the first current mirror receives the second current $I_2$, and a peak voltage signal $V_M$ is generated. The magnitude of the peak voltage signal $V_M$ is also proportional to the voltage $V_D$ across the switching device $Q_1$. The valley detection circuit 10 further comprises a peak comparator 103 coupled to receive the peak voltage signal $V_M$ for generating a control signal $S_C$ (comparison result) in response to the peak voltage signal $V_M$ and a first threshold voltage $V_{T1}$.

The valley lock circuit 20 comprises a counter 200, a register 201, a subtractor 202, and a arbitrator 203. The counter 200 is coupled to receive the control signal $S_C$ for counting the number of valleys of the reflected voltage signal $V_{DET}$ during each period and generating counting data (ex: $C_0 \sim C_3$) according to the counting result. Wherein the counter 200 counts the number of valleys of the reflected voltage signal $V_A$ generated during a current period. The register 201 is coupled to save data $R_0 \sim R_3$ related to the number of valleys of the reflected voltage signal $V_A$ generated during the previous period from the counter 200. The subtractor 202 is coupled to outputs of the counter 200 and the register 201 for receiving the data $C_0 \sim C_3$ and $R_0 \sim C_3$. The subtractor 202 performs a subtraction operation to the data $C_0 \sim C_3$ and $R_0 \sim R_3$ to generate subtraction result data $D_0 \sim D_3$. The arbitrator 203 is coupled to receive the subtraction result data $D_0 \sim D_3$ for arbitration, and a judging signal $S_L$ is provided to the PWM circuit 50. The judging signal $S_L$ is enabled once the subtraction result data $D_0 \sim D_3$ is not less than zero (positive), which presents that a same or larger valley number is detected compared to the previous resonant period. In other words, the judging signal $S_L$ is disabled once the subtraction result data $D_0 \sim D_3$ is less than zero (negative), which means that the valley lock circuit 20 is locked when a less valley number is detected compared to the previous resonant period.

Reference is again made to FIG. 4. The minimum off-time circuit 70 is coupled to receive the feedback signal $V_{FB}$ for outputting a minimum off-time signal $S_{RT}$ in response to the feedback signal $V_{FB}$. The unlock circuit 40 is coupled to receive the minimum off-time signal $S_{RT}$ and the control signal Sc for detecting the time after the minimum off-time of the minimum off-time signal $S_{RT}$ and the time between two valleys, and a unlock signal $S_{UNLOCK}$ is enabled once the time after minimum off-time of the minimum off-time signal $S_{RT}$ is longer then the time between two valleys.

The PWM circuit 50 comprises an OR gate 51, an AND gate 52, and a flip-flop 53. The OR gate 51 is coupled to receive the unlock signal $S_{UNLOCK}$ and the judging signal $S_L$. One input of the AND gate 52 is coupled to an output of the OR gate 51. The other input of the AND gate 52 is coupled to receive the minimum off-time signal $S_{RT}$. The AND gate 52 generates an output signal $S_{52}$. The flip-flop 53 has a clock terminal ck, a data terminal D, a reset terminal R, and an output terminal Q. The clock terminal ck is coupled to receive the control signal Sc for enabling the switching signal $V_G$. The data terminal D is pulled high in response to the output signal of the OR gate 51 and the minimum off-time signal $S_{RT}$. The reset terminal R is coupled to an output of a comparator 60. The comparator 60 is coupled to the feedback terminal FB and the current sense terminal CS to respectively receive the feedback voltage $V_{FB}$ and the switching current signal $V_{CS}$ to reset the D flip-flop 80 and turn off the switching signal $V_G$.

Figure 5:
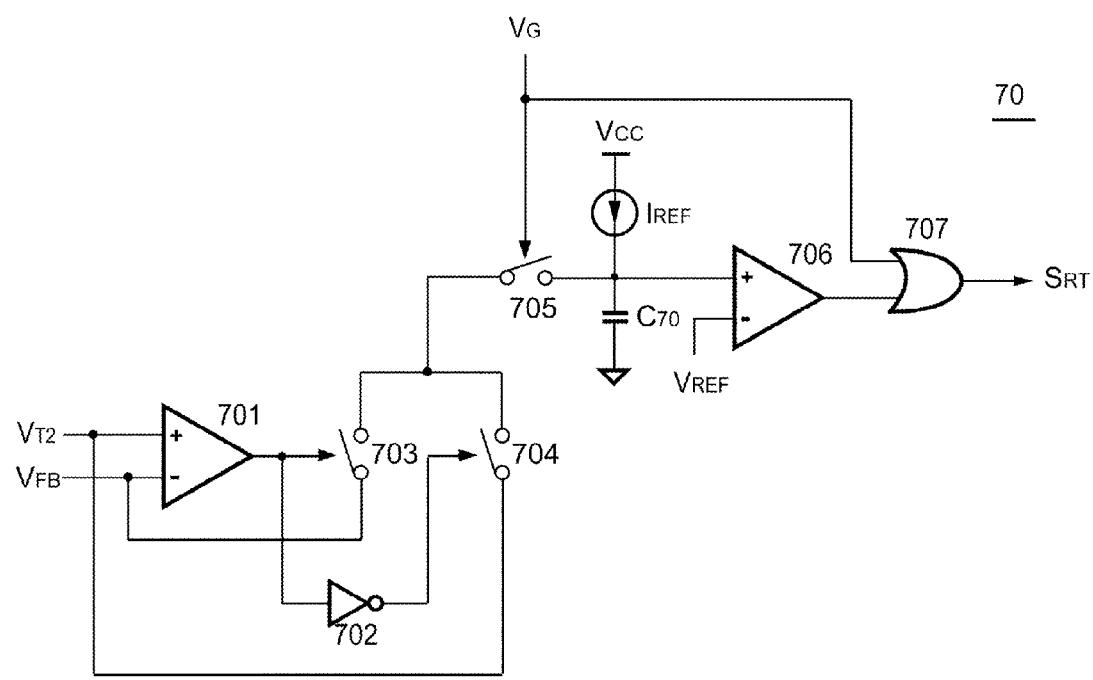
FIG. 5 shows an exemplary embodiment of a minimum off-time circuit of the switch control circuit in FIG. 4.

FIG. 5 shows an exemplary embodiment of the minimum off-time circuit 70. The minimum off-time circuit 70 comprises a first comparator 701, an inverter 702, three switches 703, 704, and 705, a current source $I_{REF}$, a capacitor $C_{70}$, a second comparator 706, and an OR gate 707. The first comparator 701 receives the feedback signal $V_{FB}$ and a second threshold voltage $V_{T2}$ for comparison. The inverter 702 is coupled to an output of the first comparator 701. The switch 703 is coupled to receive the feedback voltage $V_{FB}$ and controlled by the output of the first comparator 701, and the switch 704 is coupled to receive the second threshold voltage $V_{T2}$ and controlled by the output of the first comparator 701 through the inverter 702. The switch 705 is coupled to the switches 703 and 704 and controlled by the switching signal $V_G$. The current source $I_{REF}$ and the capacitor $C_{70}$ are coupled in series between the power $V_{CC}$ and the ground. The second comparator 706 is coupled to the joint point between the current source $I_{REF}$ and the capacitor $C_{20}$ and receives a reference voltage $V_{REF}$ for comparison. The OR gate 707 is coupled to an output of the second comparison 706 and receives the switching signal $V_G$. The OR gate 707 generates the minimum off-time signal $S_{RT}$.

Figure 6:
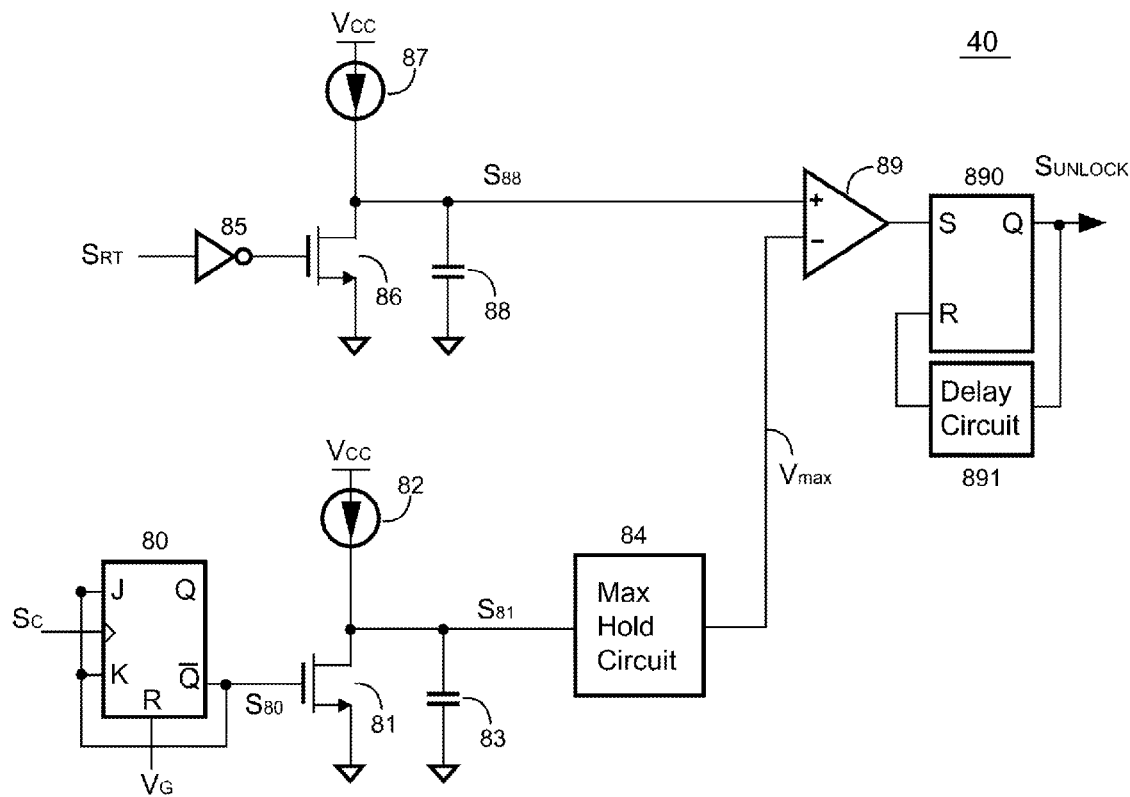
FIG. 6 shows an exemplary embodiment of a unlock circuit of the switch control circuit in FIG. 4.
Figure 7:
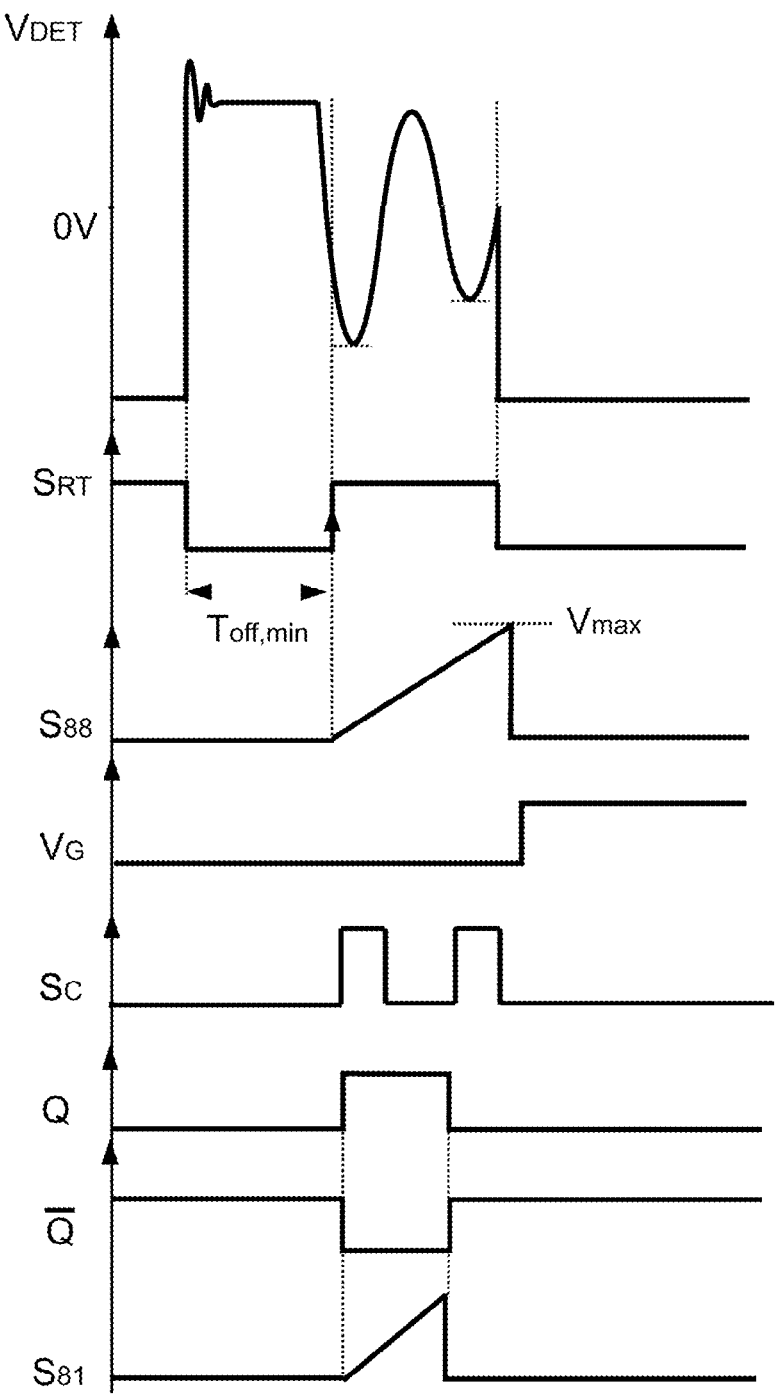
FIG. 7 shows waveforms of signals of the switching power converter in FIG. 3.

FIG. 6 shows an exemplary embodiment of the unlock circuit 40. In the unlock circuit 40, a flip-flop 80, a switch 81, a current source 82, an capacitor 83 and a max hold circuit 84 develop a detecting circuit for detecting the interval time between two valleys during each period. An inverter 85, a switch 86, a current source 87, a capacitor 88, and a comparator 89 develop a limiting circuit for limiting the time after minimum of time. Referring to FIG. 7 as well, after the switching device $Q_1$ is turned off, the reflected voltage signal $V_A$ has alternate positive voltage and negative voltage. When the magnitude of the peak voltage signal $V_M$ is greater than the first threshold voltage $V_{T1}$, the control signal $S_C$ is enabled. An output signal $S_{80}$ from flip-flop 80 is disabled in response to a rising edge of the control signal $S_C$, and a ramp signal $S_{81}$ is generated in response to a charging circuit composed by current source 82 and the capacitor 83. Then, a max voltage signal $V_{MAX}$ is generated at an output of the max hold circuit 84 and transferred to a negative input of the comparator 89. Another ramp signal $S_{88}$ is also generated at a positive input of the comparator 89 in response to the pulse width of the minimum off-time signal $S_{RT}$. The unlock signal $S_{UNLOCK}$ is enabled through another flip-flop 890 once the magnitude of the ramp signal $S_{58}$ is greater than the max voltage signal $V_{MAX}$, and disabled through a delay circuit 891 after a delay time.

Figure 8:
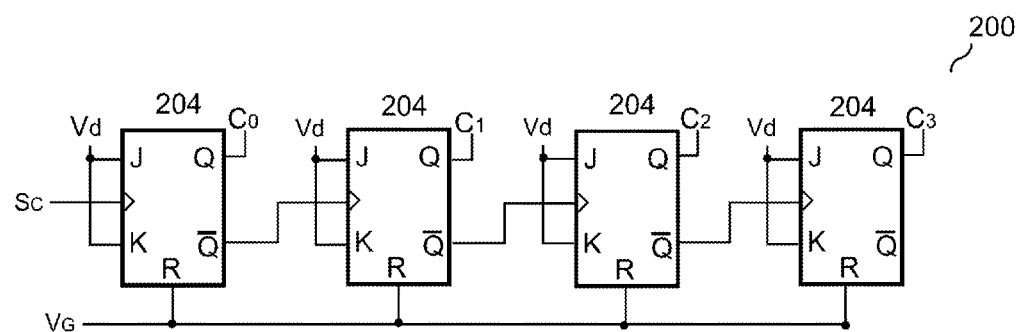
FIG. 8 is an exemplary embodiment of a counter of a valley lock circuit of the switch control circuit in FIG. 4.

FIG. 8 is an exemplary embodiment of the counter 200 of the valley lock circuit 20. The counter 200 is a four-bit counter comprising four flip-flops 204 for generating data $C_0 \sim C_3$ in response to the rising edge of the control signal $S_C$. Each counter 204 further has a reset terminal R for resetting in response to another rising edge of the switching signal $V_G$. The counter is a popular circuit so the description is omitted here.

Figure 9:
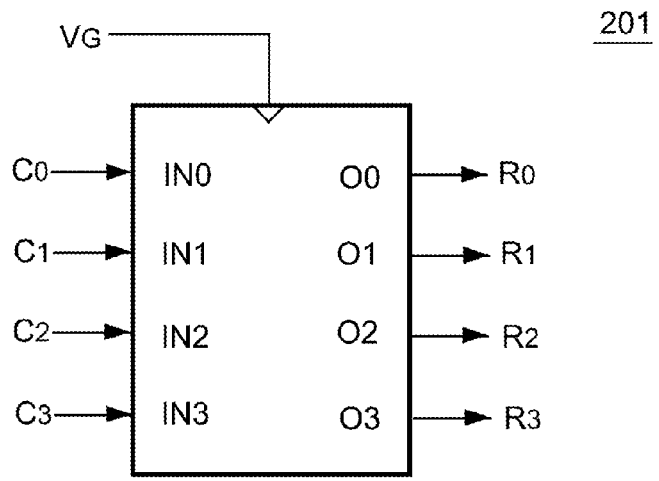
FIG. 9 is an exemplary embodiment of a register of a valley lock circuit of the switch control circuit in FIG. 4.

FIG. 9 shows an exemplary embodiment of the register 201 of the valley lock circuit 20. The register 201 has inputs IN0~IN3 for receiving the data $C_0 \sim C_3$ from the counter 200 in response to the rising edge of the switching signal $V_G$. The register 201 also has outputs O0~O3 for outputting data $R_0 \sim R_3$.

Figure 10:
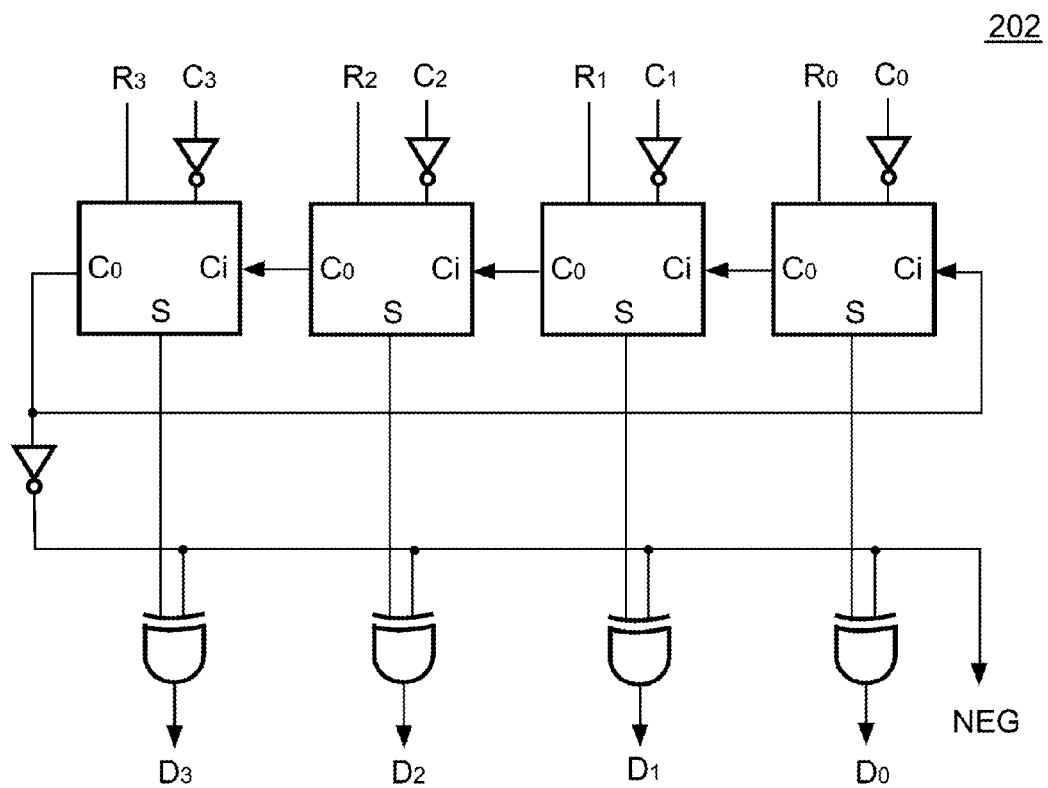
FIG. 10 is an exemplary embodiment of a subtractor of a valley lock circuit of the switch control circuit in FIG. 4.

FIG. 10 shows an exemplary embodiment of the subtractor 202. The subtractor 202 is developed by a plurality of full adder for receiving the data $C_0 \sim C_3$ and $R_0 \sim C_3$ respectively and performing a subtraction process. Then, the subtraction result data $D_0 \sim D_3$, and NEG are outputted. The subtraction result data NEG is enabled when the subtraction result is positive and disabled when the subtraction result is negative.

Figure 11:
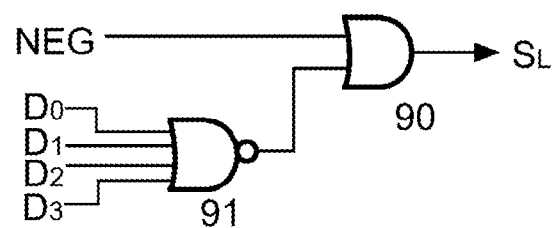
FIG. 11 is an exemplary embodiment of an arbitrator of a valley lock circuit of the switch control circuit in FIG. 4.

FIG. 11 shows an exemplary embodiment of the arbitrator 203 of the valley lock circuit 20. The arbitrator 203 comprises an OR gate 90 and a NOR gate 91. The OR gate 90 is coupled to receive the subtraction result data $D_0 \sim D_3$ through the NOR gate 91 and also receive the subtraction result data NEG. The OR gate 90 outputs the judging signal $S_L$ after a logic operation.

Figure 12A:
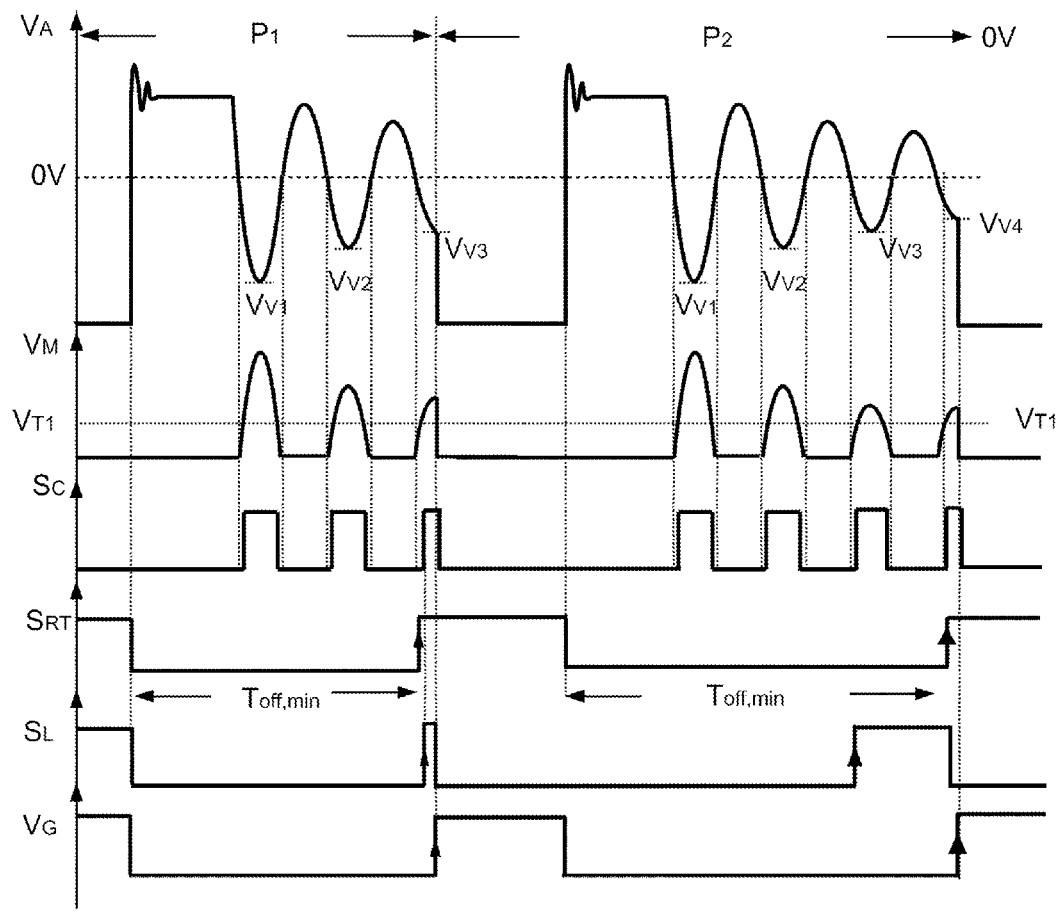
FIGS. 12A and 12B show waveforms of signals of the switching power converter in FIG. 3.

Reference is again made to FIG. 12A as well as FIG. 4, when the switching device $V_A$ has alternate positive voltage and negative voltage, the magnitude of the peak voltage signal $V_M$ is inverse proportional to a first voltage $V_{V1}/V_{V2}/V_{V3}/V_{V4}$. When the magnitude of the peak voltage signal $V_M$ is greater than the first threshold voltage $V_{T1}$, the control signal $S_C$ is enabled. When the valley number during the second period (current period) P2 is larger then the first period (previous period) P1, the judging signal $S_L$ is turned to logic high. At the mean time, since the output signal $S_{RT}$ is logic high, the switching signal $V_G$ is enabled in response to the rising edge of the control signal $S_C$.

Figure 12B:
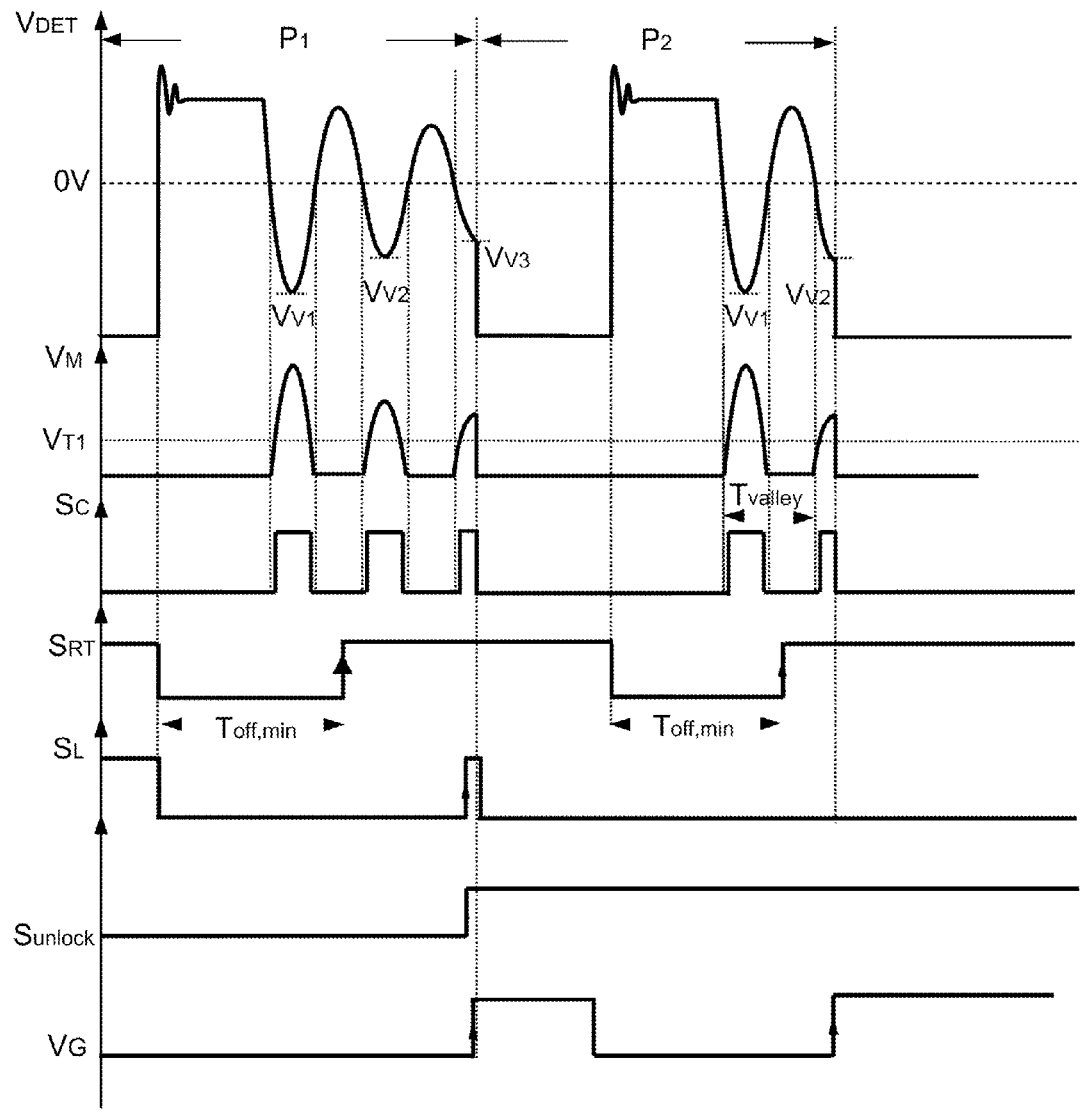

Reference is again made to FIG. 12B as well as FIG. 4, after the switching device $Q_1$ is turned off, the reflected voltage signal $V_A$ has alternate positive voltage and negative voltage. The unlock signal $S_{UNLOCK}$ will be enabled during first period $P_1$ once the time after minimum off-time $T_{Off,min}$ is longer then the time between two valleys $T_{valley}$. At the second period $P_2$, the valley number during second period $P_2$ is less then the first period $P_1$, so that the judging signal $S_L$ is still disabled. Since the output signal $S_{RT}$ is logic high, the switching signal $V_G$ is turned to logic high (turned-on state) in response to the enabled of the rising edge of the control signal $S_C$.

In summary, the switching control circuit of the present invention can detect whether the voltage $V_D$ across the switching device $Q_1$ is close to the valley voltage in accordance with the reflected voltage signal $V_A$ while the switching device $Q_1$ is turned off. Moreover, the switching signal $V_G$ can be locked once the valley number during each period is less then the corresponding previous period for avoiding noise from valley switching. Therefore, the switching control circuit of the present invention can provide high efficiency for the switching power converter when operating in various loading conditions.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A switching control circuit for a switching power converter, the switching control circuit being coupled to a switching device and an auxiliary winding of a transformer, wherein the switching control circuit comprises:
   a valley detecting circuit coupled to receive a reflected voltage signal from the auxiliary winding of the transformer for outputting a control signal in response to the reflected voltage signal;
   a valley lock circuit coupled to receive the control signal for outputting a judging signal in response to the control signal during a first period and a second period following the first period; and
   a pulse width modulation (PWM) circuit outputting a switching signal in response to the judging signal.

2. The switching control circuit as claimed in claim 1, further comprising:
   a minimum off-time circuit coupled to receive a feedback signal for generating a minimum off-time signal; and
   a unlock circuit coupled to receive the minimum off-time signal and the control signal for generating a unlock signal;
   wherein the minimum off-time signal is correlated to the feedback signal, the unlock signal is correlated to the minimum off-time signal and the control signal.

3. The switching control circuit as claimed in claim 2, wherein the unlock circuit comprises:
   a detecting circuit coupled to receive the control signal for outputting a max voltage signal; and
   a limiting circuit coupled to receive the minimum off-time signal for generating the unlock signal in response to the max voltage signal.

4. The switching control circuit as claimed in claim 2, wherein the minimum off-time circuit comprises:
   a first comparator coupled to receive the feedback signal and a threshold voltage for comparison;
   an inverter coupled to an output of the first comparator;
   a first switch coupled to receive the feedback signal and controlled by the output of the first comparator;
   a second switch coupled to receive the threshold voltage and controlled by the output of the first comparator through the inverter;
   a third switch coupled to the first and second switches and controlled by the switching signal;
   a current source and a capacitor coupled in series between a power and a ground;
   a second comparator coupled to a joint point between the current source and the capacitor and receiving a reference voltage for comparison; and
   an OR gate coupled to an output of the second comparator and receiving the switching signal for generating the minimum off-time signal.

5. The switching control circuit as claimed in claim 1, wherein the valley detecting circuit comprises:
   a switch coupled to the auxiliary winding of the transformer through a resistor for receiving the reflected voltage signal from the resistor while the switching device is turned off;
   a first current mirror coupled to the switch for transforming a first current flowing through the switch into a second current;
   a sampling resistor coupled to the first current mirror for receiving the second current and generating a peak voltage signal; and
   a comparator coupled to the sampling resistor for comparing the peak voltage signal and a threshold voltage and outputting the control signal.

6. The switching control circuit as claimed in claim 1, wherein valley lock circuit comprises:
   a counter coupled to receive the control signal for counting a number of valleys of the reflected voltage signal during each of the first and second periods and generating data according to a counting result;
   a register coupled to the counter for saving the data related to the number of valleys of the reflected voltage signal during the first period;
   a subtractor coupled to the counter and the register for receiving and performing a subtraction operation to the data related to the number of valleys of the reflected voltage signal during the second period and the data related to the number of valleys of the reflected voltage signal during the first period to generate subtraction result data; and
   an arbitrator coupled to receive the subtraction result data for arbitration to generate the judging signal.

7. A switching power converter comprising:
   a switching device controlled by a switching signal;
   a transformer having a primary winding and an auxiliary winding;
   a switching control circuit coupled to the switching device and the auxiliary winding of the transformer, wherein the switching control circuit comprises:
      a valley detecting circuit coupled to receive a reflected voltage signal from the auxiliary winding of the transformer for outputting a control signal in response to the reflected voltage signal, wherein the reflected voltage signal is generated from a resistor coupled to the auxiliary winding of the transformer while the switching device is turned off;
      a valley lock circuit coupled to receive the control signal for outputting a judging signal in response to the control signal during a first period and a second period following the first period; and
      a PWM circuit coupled to the valley lock circuit for receiving the judging signal and outputting the switching signal to turn on the switching device in response to the judging signal.

8. The switching power converter as claimed in claim 7, wherein the switching control circuit further comprises:
   a minimum off-time circuit coupled to receive a feedback signal for generating a minimum off-time signal; and
   a unlock circuit coupled to receive the minimum off-time signal and the control signal for generating a unlock signal;
   wherein the minimum off-time signal is correlated to the feedback signal, the unlock signal is correlated to the minimum off-time signal and the control signal.

9. The switching power converter as claimed in claim 8, wherein the unlock circuit comprises:
   a detecting circuit coupled to receive the control signal for outputting a max voltage signal; and
   a limiting circuit coupled to receive the minimum off-time signal for generating the unlock signal in response to the max voltage signal.

10. The switching power converter as claimed in claim 8, wherein the minimum off-time circuit comprises:
- a first comparator coupled to receive the feedback signal and a threshold voltage for comparison;
- an inverter coupled to an output of the first comparator;
- a first switch coupled to receive the feedback signal and controlled by the output of the first comparator;
- a second switch coupled to receive the threshold voltage and controlled by the output of the first comparator through the inverter;
- a third switch coupled to the first and second switches and controlled by the switching signal;
- a current source and a capacitor coupled in series between a power and a ground;
- a second comparator coupled to a joint point between the current source and the capacitor and receiving a reference voltage for comparison; and
- an OR gate coupled to an output of the second comparator and receiving the switching signal for generating the minimum off-time signal.

11. The switching power converter as claimed in claim 7, wherein the valley detecting circuit comprises:
- a switch coupled to the auxiliary winding of the transformer through the resistor for receiving the reflected voltage signal from the resistor while the switching device is turned off;
- a first current mirror coupled to the switch for transforming a first current flowing through the switch into a second current;
- a sampling resistor coupled to the first current mirror for receiving the second current and generating a peak voltage signal; and
- a comparator coupled to the sampling resistor for comparing the peak voltage signal and a threshold voltage and outputting the control signal.

12. The switching power converter as claimed in claim 7, wherein valley lock circuit comprises:
- a counter coupled to receive the control signal for counting a number of valleys of the reflected voltage signal during each of the first and second periods and generating data according to a counting result;
- a register coupled to the counter for saving the data related to the number of valleys of the reflected voltage signal during the first period;
- a subtractor coupled to the counter and the register for receiving and performing a subtraction operation to the data related to the number of valleys of the reflected voltage signal during the second period and the data related to the number of valleys of the reflected voltage signal during the first period to generate subtraction result data; and
- an arbitrator coupled to receive the subtraction result data for arbitration to generate the judging signal.

* * * * *